(No Model.)

A. D. KLABER.
STAND FOR DUPLICATING APPARATUS.

No. 543,830. Patented July 30, 1895.

Witnesses
Louis S Thomason
H A Pumphrey

Inventor
Augustus D. Klaber
By his Attorney
Davis & Co

UNITED STATES PATENT OFFICE.

AUGUSTUS D. KLABER, OF NEW YORK, N. Y., ASSIGNOR TO THE NEOSTYLE COMPANY, OF NEW JERSEY.

STAND FOR DUPLICATING APPARATUS.

SPECIFICATION forming part of Letters Patent No. 543,830, dated July 30, 1895.

Application filed May 20, 1892. Renewed March 24, 1894. Serial No. 505,013. (No model.)

*To all whom it may concern:*

Be it known that I, AUGUSTUS D. KLABER, a subject of the Queen of Great Britain, residing at New York, in the county of New York and State of New York, have invented a certain new, useful, and valuable Improvement in Cabinets or Stands, of which the following is a full, clear, and exact description.

My invention has reference to cabinets or stands for duplicating apparatus, and has for its object to provide a neat, simple, and efficient cabinet adapted to contain a duplicating apparatus, which is easily accessible to and always ready for use. Furthermore, it provides an inking-plate and paper-holder, which is adapted to be brought into operation by the same means and at the same time as the duplicating apparatus.

The invention consists in the arrangement and combination of its several parts, as will be hereinafter more fully described, and set forth in the subjoined claims.

Figure 1:
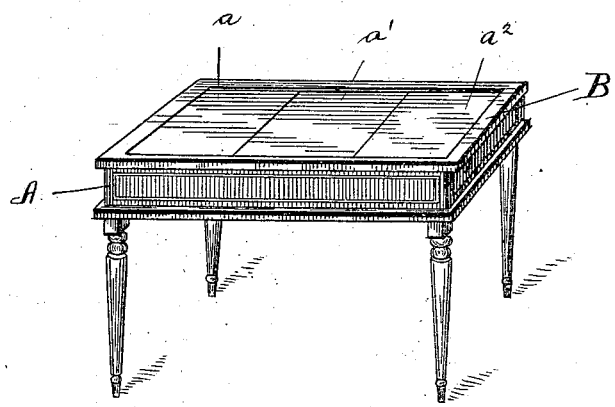
Figure 2:
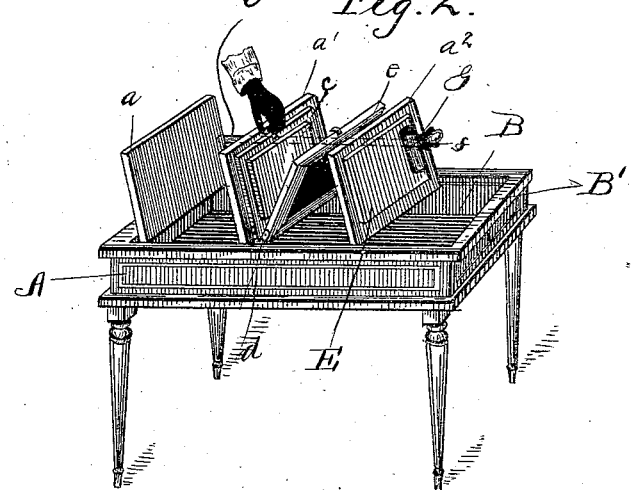
Figure 3:
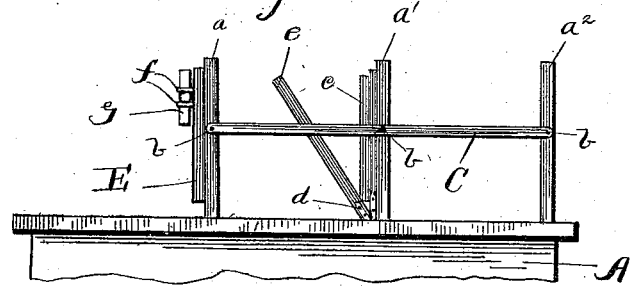

In the drawings, Figure 1 is a perspective view of my improved stand or cabinet closed. Fig. 2 is a view showing the cabinet opened. Fig. 3 is a detail view.

Referring to the drawings, A represents the body of the stand or cabinet provided with a recess or compartment B. This compartment or recess has for a cover or top three pivoted lids $a$ $a'$ $a^2$, said lids being pivoted on the inner edge of the top frame B' and opening sidewise. Secured by screws $b$ or other suitable means to one edge of the lids in the center thereof is a rod or lever C. The lids $a$ $a'$ $a^2$ serve two purposes—first, as a cover to the compartment, so that when the duplicating apparatus is not in use the whole forms a useful office table or desk, and, second, to have secured to their under sides the various parts of the duplicating apparatus—as, for example, as shown in Fig. 2, in which the lid $a'$ has a plate $c$ provided with a raised portion. Secured to the lower ends of the plate $c$ is one leaf of hinge $d$, the other leaf of which is secured to the lower end of a frame $e$, adapted to hold a stencil, the whole device thus attached to lid $a'$ forming a well-known style of duplicating apparatus called the "Neostyle." The lid $a^2$ is provided with a plate E, said plate being used as an inking-plate. Secured to said plate E is a bracket $f$, the object of which is to provide a support for the roller G.

The object of the rod C is to afford means whereby the lids may all be brought into position most convenient for operating the frame, roller, and inking-plate, the said lids automatically opening together, the compartment B forming a well for printed copies to fall into and the lid $a$ forming an extension to hold the blank paper, &c., the operation for obtaining this result being as follows: The stand being closed and it being desired to use the duplicating apparatus, the operator lifts the lid $a'$ by means of the knob or hook provided for that purpose. The lids $a$ $a^2$ being secured to said lid $a'$ by means of the rod C are lifted at the same time. The operator can swing the lids over, thereby bringing into position the various parts of the duplicating apparatus ready for operation. A strip of wood or other suitable material is placed in the compartment B to support the lids and prevent them from falling into the said compartment.

Thus it will be seen that it takes but a second to open or close the cabinet and provides means whereby the apparatus may be protected from dust, &c., or the stencil be protected from being broken, as is often the case when left exposed.

I do not wish to be confined to the exact construction shown and described heretofore, inasmuch as I prefer to have the lid $a^2$ disconnected from the rod C and swing independent of the other lids, or the rod C may be done away with entirely and each lid be provided with a knob or hook and open independent of each other.

The legs of the stand are adapted to be screwed to the frame of the table or stand, thereby affording means whereby when the stand is packed for transportation it will take but little room and form a compact freight-box.

Having described my invention, what I claim is—

1. In a cabinet or stand for a duplicating apparatus the combination with the body thereof having a closed bottom, a top for said stand or cabinet consisting of hinged lids to the under sides of which are secured the several parts of a duplicating apparatus, said duplicating apparatus being brought into operative position when the lids are open, and inclosed within the bottom of the stand when the lids are folded over in their closed position, substantially as described.

2. In a cabinet or stand, for a duplicating apparatus, the combination with the body thereof having a closed bottom so arranged below the top of said stand as to form a hollow compartment, a plurality of lids pivoted to the upper part of the stand, and to the under sides of which are secured the several parts of a duplicating apparatus, and a rod connecting the several lid sections, said duplicating apparatus being brought into operative position when the lids are open, and inclosed within the hollow compartment when the lids are closed, substantially as described.

In testimony whereof I affix my signature in presence of two witnesses.

AUGUSTUS D. KLABER.

Witnesses:
J. GREENBERG,
C. H. MEYER.